US009445481B2

(12) United States Patent
Kim

(10) Patent No.: US 9,445,481 B2
(45) Date of Patent: Sep. 13, 2016

(54) POWER SUPPLY DEVICE FOR LED AND LIGHT EMITTING DEVICE HAVING THE SAME

(71) Applicant: LG INNOTEK CO., LTD., Seoul (KR)

(72) Inventor: Dae Hun Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 512 days.

(21) Appl. No.: 13/836,838

(22) Filed: Mar. 15, 2013

(65) Prior Publication Data

US 2014/0062332 A1 Mar. 6, 2014

(30) Foreign Application Priority Data

Aug. 29, 2012 (KR) ........................ 10-2012-0095257

(51) Int. Cl.
*H05B 37/02* (2006.01)
*H05B 33/08* (2006.01)

(52) U.S. Cl.
CPC .......... *H05B 37/0272* (2013.01); *H05B 33/08* (2013.01); *H05B 33/0884* (2013.01); *Y02B 60/50* (2013.01)

(58) Field of Classification Search
USPC .............. 315/160, 227 R, 228, 246.291, 294
See application file for complete search history.

(56) References Cited

U.S. PATENT DOCUMENTS

2008/0265782 A1 10/2008 Crouse et al.
2010/0327766 A1* 12/2010 Recker et al. ................ 315/291
2011/0083028 A1* 4/2011 Jung ....................... H02J 9/005 713/323
2011/0248643 A1 10/2011 Liu et al.

FOREIGN PATENT DOCUMENTS

WO WO-2007-063480 A2 6/2007

OTHER PUBLICATIONS

European Search Report dated Feb. 28, 2014 in European Application No. 13-16-3118.6.

* cited by examiner

*Primary Examiner* — Thai Pham
(74) *Attorney, Agent, or Firm* — Saliwanchik, Lloyd & Eisenschenk

(57) ABSTRACT

Disclosed is a power supply device including a wired controller receiving AC power to generate a driving voltage, and outputting a lighting driving signal, a wireless controller wirelessly receiving a lighting control signal and outputting the lighting control signal to the wired controller, and a standby power supply unit receiving a reference standby voltage based on the driving voltage, storing the reference standby voltage, and supplying the reference standby voltage to the wireless controller as standby power. In the lighting control device based on wired/wireless communication, the power is always obtained from the super capacitor to turn on the wireless controller, so that the turn-on state of the power generator of the wired controller is not always required. The power consumption is reduced by reducing the standby power.

13 Claims, 5 Drawing Sheets

POWER SUPPLY DEVICE FOR LED AND LIGHT EMITTING DEVICE HAVING THE SAME

CROSS-REFERENCE TO RELATED APPLICATION

This application claims the benefit under 35 U.S.C. §119 of Korean Patent Application No. 10-2012-0095257, filed Aug. 29, 2012, which is hereby incorporated by reference in its entirety.

BACKGROUND

The disclosure relates to a power supply device for a light emitting device.

A light emitting diode device (LED) is a light emitting semiconductor serving as a semiconductor PN junction device to convert electrical energy into light energy. The LED is a device to emit light through the recombination between electrons and holes at the PN junction region or the active layer by applying current to a compound semiconductor terminal.

The lighting apparatus employing the LED as a lighting source is controlled through both of wired control and wireless control.

In this case, when the wireless control is performed, as well as the wired control performed by receiving basic power through a cable, a wireless module is required to make wireless communication.

Since the wireless module receives a wireless control signal applied from the external device to generate the lighting control signal, the wireless module must be always maintained at an on-state.

Therefore, the power is always required to maintain the on-state of the wireless module, and the power may be obtained from power applied through the wired control.

However, if the wired control module is always maintained at the on-state for the wireless control, the great quantity of standby power is consumed.

To this end, a scheme employing a backup-battery has been suggested. Since the backup-battery has the endurance weaker than that of a light emitting diode, problems may be caused in the replacement of the backup-battery.

BRIEF SUMMARY

The embodiment provides a power supply device for a light emitting diode device capable of reducing the standby power for the wireless control.

According to the embodiment, there is provided a power supply device including a wired controller receiving AC power to generate a driving voltage, and outputting a lighting driving signal, a wireless controller wirelessly receiving a lighting control signal and outputting the lighting control signal to the wired controller, and a standby power supply unit receiving a reference standby voltage based on the driving voltage, storing the reference standby voltage, and supplying the reference standby voltage to the wireless controller as standby power.

In addition, according to the embodiment, there is provided a lighting apparatus including a lighting unit including a plurality of lighting emitting diodes, and a lighting control unit receiving AC power, and receiving a lighting control signal for the lighting unit through a wired scheme or a wireless scheme to output a lighting driving signal to the lighting unit. The lighting control unit includes a capacitor storing a reference standby voltage generated from on the AC power and supplying the reference standby voltage as standby power to wirelessly receive the lighting control signal.

Meanwhile, according to the embodiment, there is provided a method of driving a lighting apparatus including a lighting unit including a plurality of lighting emitting diodes, and a lighting control unit receiving AC power, receiving a lighting control signal for the lighting unit through a wired scheme or a wireless scheme to output a lighting driving signal to the lighting unit, and including a capacitor storing a reference standby voltage generated from the AC power and supplying the reference standby voltage as standby power to wirelessly receive the lighting control signal. The method includes periodically checking a voltage level of the capacitor, charging the capacitor with the AC power if the voltage level of the capacitor is lower than a first reference voltage, and discharging the voltage of the capacitor as a voltage for standby power by cutting off the AC power if the voltage level of the capacitor is higher than a level of a second reference voltage.

As described above, according to the lighting control device based on wired/wireless communication of the present invention, the power is always obtained from the super capacitor to turn on the wireless controller, so that the turn-on state of the power generator of the wired controller is not always required. Accordingly, the power consumption can be reduced by reducing the standby power. In addition, the light emitting diode can be semipermanently realized according to the life span thereof by employing the super capacitor, so that the reliability of the operation of the wireless controller can be ensured.

DETAILED DESCRIPTION

Hereinafter, an exemplary embodiment of the disclosure will be described to be implemented by those skilled in the art in detail with reference to accompanying drawings. However, the disclosure can be variously modified, and not limited to the embodiment.

In the following description, when a predetermined part "includes" a predetermined component, the predetermined part does not exclude other components, but may further include other components if there is a specific opposite description.

According to a lighting control device including a wireless controller of the present invention, the lighting control device can be wirelessly controlled without always turning on a wired controller by employing an additional power unit to supply power for wireless control.

Hereinafter, a lighting apparatus 10 according to the embodiment of the disclosure will be described with reference to FIGS. 1 to 4.

Figure 1:
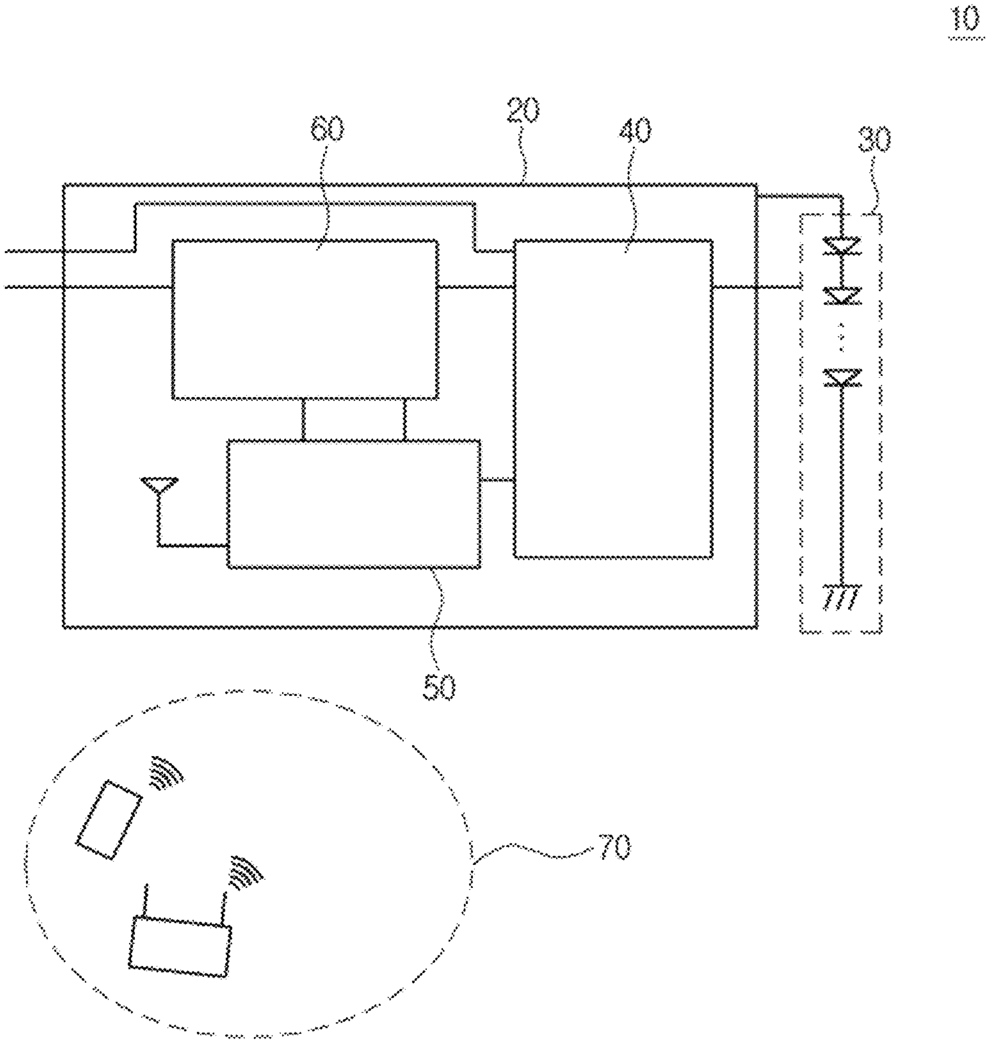
FIG. 1 is a view showing a lighting apparatus according to the embodiment.
Figure 2:
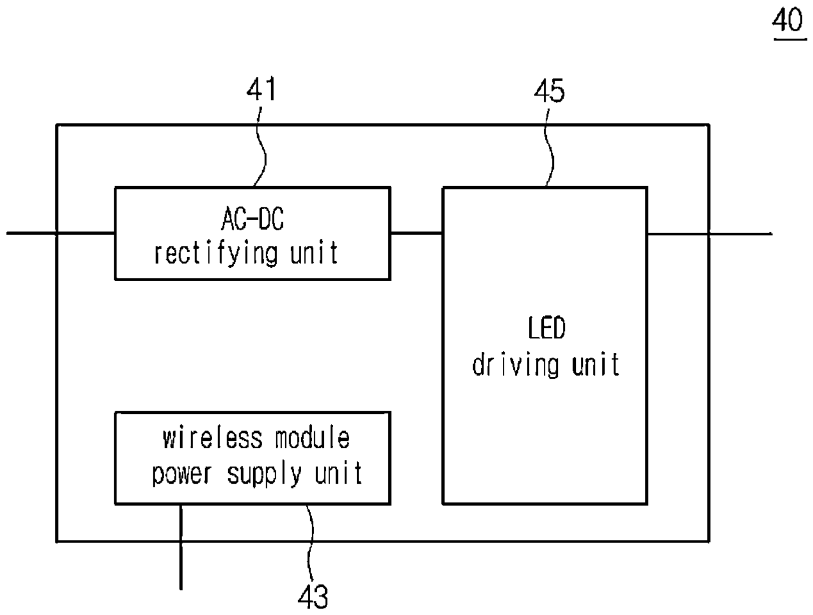
FIG. 2 is a block diagram showing the structure of a wired controller of FIG. 1.
Figure 3:
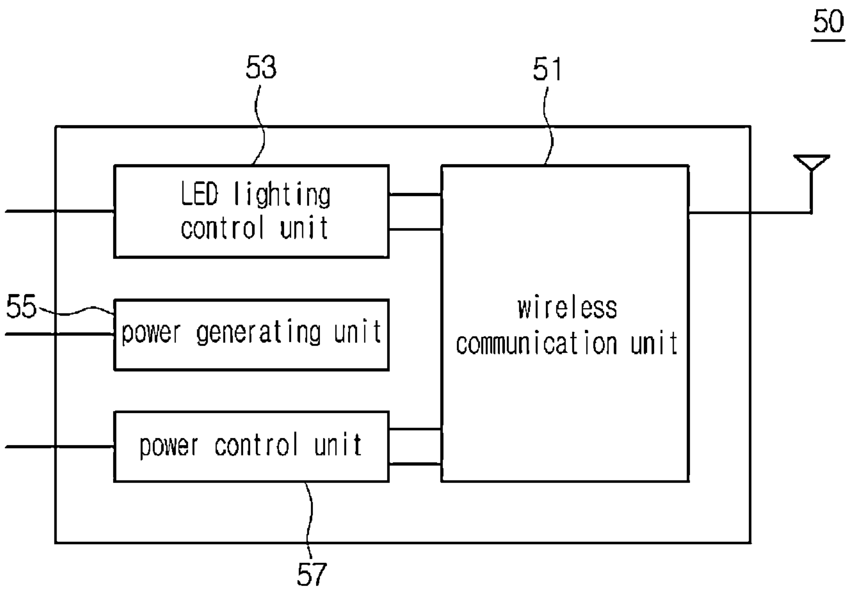
FIG. 3 is a block diagram showing the structure of a wireless controller of FIG. 2.
Figure 4:
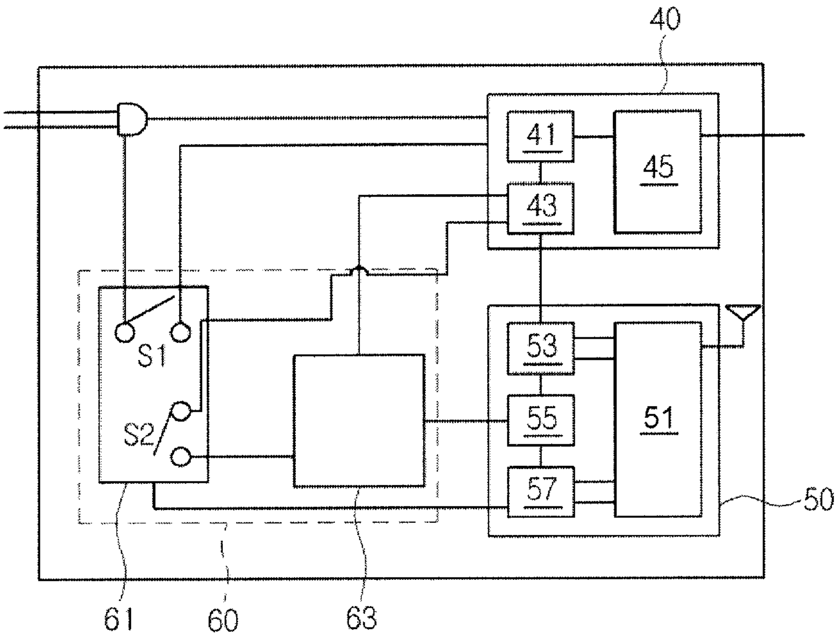
FIG. 4 is a block diagram showing the structure of a standby power supply unit of FIG. 3.

FIG. 1 is a view showing the lighting apparatus 10 according to the embodiment, FIG. 2 is a block diagram showing the structure of a wired controller 40 of FIG. 1, and FIG. 3 is a block diagram showing the structure of a wireless controller 50 of FIG. 2. FIG. 4 is a block diagram showing the structure of a standby power supply unit 60 of FIG. 3.

Referring to FIG. 1, the lighting apparatus 10 includes a lighting unit 30 and a lighting control unit 20.

The lighting unit 30 includes a plurality of light emitting diodes, and the light emitting diodes may be connected to each other in series as shown in FIG. 1. Alternatively, the light emitting diodes may be connected to each other in parallel.

The lighting unit 30 may be provided in the form of a lamp by grouping the light emitting diodes. Alternately, the lighting unit 30 may include a light guide plate or a diffusion plate to serve as a surface light source.

In addition, the lighting unit 30 may include a plurality of light emitting diodes to represent a plurality of colors. For example, when the light emitting diode includes red, blue, and green light emitting diodes, the lighting unit 30 may adjust the color temperature by controlling an on/off-state and an on/off time of each light emitting diode.

The lighting control unit 20 generates a driving signal to control an on/off-state of the lighting unit 30.

The driving signal for the lighting serves as a pulse signal, and the turn-on time of the light emitting diode is determined according to the pulse duty of the pulse signal.

The lighting control unit 20 includes the wired controller 40, the wireless controller 50, and the standby power supply unit 60.

The wired controller 40 receives and converts reference AC voltage through a cable and generates driving voltage. The wired controller 40 receives a control signal through a cable and generates a lighting driving signal according to the control signal.

The wired controller 40 includes an AC-DC rectifying unit 41, a wireless module power supply unit 43, and an LED driving unit 45 as shown in FIG. 2.

The AC-DC rectifying unit 41 receives 110/220V AC voltage, and converts the AC voltage into driving voltage having a level to drive the lighting control unit 20.

The driving voltage is DC voltage. The AC-DC rectifying unit 41 may include a rectifying circuit to convert AC into DC and a transformer to adjust a voltage level.

The rectifying circuit may include a bridge rectifier, and the transformer may include a typical transformer such as a flyback converter.

The LED driving unit 45 receives the driving voltage from the AC-DC rectifying unit 41 and operates by the driving voltage to generate a lighting driving signal having a level to turn on the light emitting diode of the lighting unit 30.

The LED driving unit 45 may include a pulse width modulator, and may adjust the brightness of the light emitting diode according to the pulse duty rate.

The LED driving unit 45 may receive the driving voltage of 19V, but the embodiment is not limited thereto.

Meanwhile, the wired controller 40 includes the wireless module power supply unit 43.

The wireless module power supply unit 43 receives the driving voltage from the AC-DC rectifying unit 41 and converts the driving voltage to generate wireless reference voltage used to generate the driving voltage for driving the wireless controller 50.

The wireless reference voltage may be 3.6V. The value of the wireless reference voltage may vary depending on the specification of the wireless controller 50.

The wireless module power supply unit 43 may include a DC-DC converter.

Meanwhile, the lighting control unit 20 includes the wireless controller 50, such as a remote controller or a smart phone that is generally used, to control the lighting unit 30 by receiving a control signal through a wireless network.

The wireless controller 50 includes a wireless communication unit 51 connected to an antenna, an LED lighting control unit 53, a power generating unit 55, and a power control unit 57.

The wireless communication unit 51 is connected to the antenna to transreceive a wireless control signal through a wireless network like a wireless device, preferably, a remote controller or a smart phone.

The wireless network may employ a short range communication scheme such as a ZigBee scheme or a Bluetooth scheme. Alternatively, the wireless network may include an RFID.

In addition, the wireless network may make communication by using WiFi.

The wireless communication unit 51 amplifies and demodulates a wireless control signal received through the wireless network to extract a base control signal from the wireless control signal.

The LED lighting control unit 53 receives the base control signal received therein from the wireless communication unit 51, extracts dimming information and color temperature information, which is used to drive the lighting unit 30, from the base control signal, and outputs the dimming information and the color temperature information to the LED driving unit 45.

Meanwhile, the wireless communication unit 51 must be always turned on in order to receive the wireless control signal irregularly applied from the external device.

In other words, the wireless communication unit 51 operates at a sleep mode, which is a standby state to receive the wireless control signal, in addition to an active mode of receiving and processing the wireless control signal.

The wireless communication unit 51 must be always turned on in order to maintain the sleep mode. In this case, the wireless communication unit 51 requires standby power.

In order to apply the standby power for the turn-on state of the wireless communication unit 51, the wireless controller 50 includes the power generating unit 55 and the power control unit 57.

The power generating unit 55 receives the reference standby power supplied from the standby power supply unit 60, and converts the reference standby power into the standby power having a level required at the sleep mode of the wireless communication unit 51.

The power generating unit 55 may include a DC-DC converter.

Meanwhile, the power control unit 57 periodically senses the state of the standby power supply unit 60 to output a switching signal so that the wireless reference voltage of the wireless module power supply unit 43 is supplied to the wireless module power supply unit 43 according to the power levels of the standby power supply unit 60.

The wireless controller 50 may further include a module control unit (not shown) to wholly control the operations of the wireless communication unit 51, the power generating unit 55, and the power control unit 57. The module control unit may be realized by using a processor.

Meanwhile, referring to FIG. 4, the lighting control unit 20 further includes the standby power supply unit 60.

The standby power supply unit 60 includes a switching unit 61, which is used to supply the AC power to the wired controller 40 and to supply the wireless reference voltage to the standby power supply unit 60, and the storage unit 63 to receive and store the wireless reference voltage transmitted through the switching unit 61.

The storage unit 63 includes a super capacitor. The super capacitor has a large capacity, and is semipermanently available.

The super capacitor of the storage unit 63 repeats a cycle of receiving the wireless reference power through the switching unit 61, being charged with the wireless reference power, and then being discharging so that the power is supplied to the power generating unit 55 of the wireless controller 50.

The super capacitor has a charge capacity in the range of 3.6 V to 5.5 V.

The switching unit 61 includes relay switches S1 and S2. In particular, the switching unit 61 includes at least two switches S1 and S2.

The switching unit 61 includes the first switch S1 used to supply the AC power to the AC-DC rectifying unit 41 of the wired controller 40 and the second switch S2 used to supply the wireless reference power of the wireless module power supply unit 43 to the super capacitor.

The first and second switches S1 and S2 are turned on or turned off by receiving the switching signal from the power control unit 57. The first and second switches S1 and S2 are simultaneously turned on or simultaneously turned off.

Figure 5:
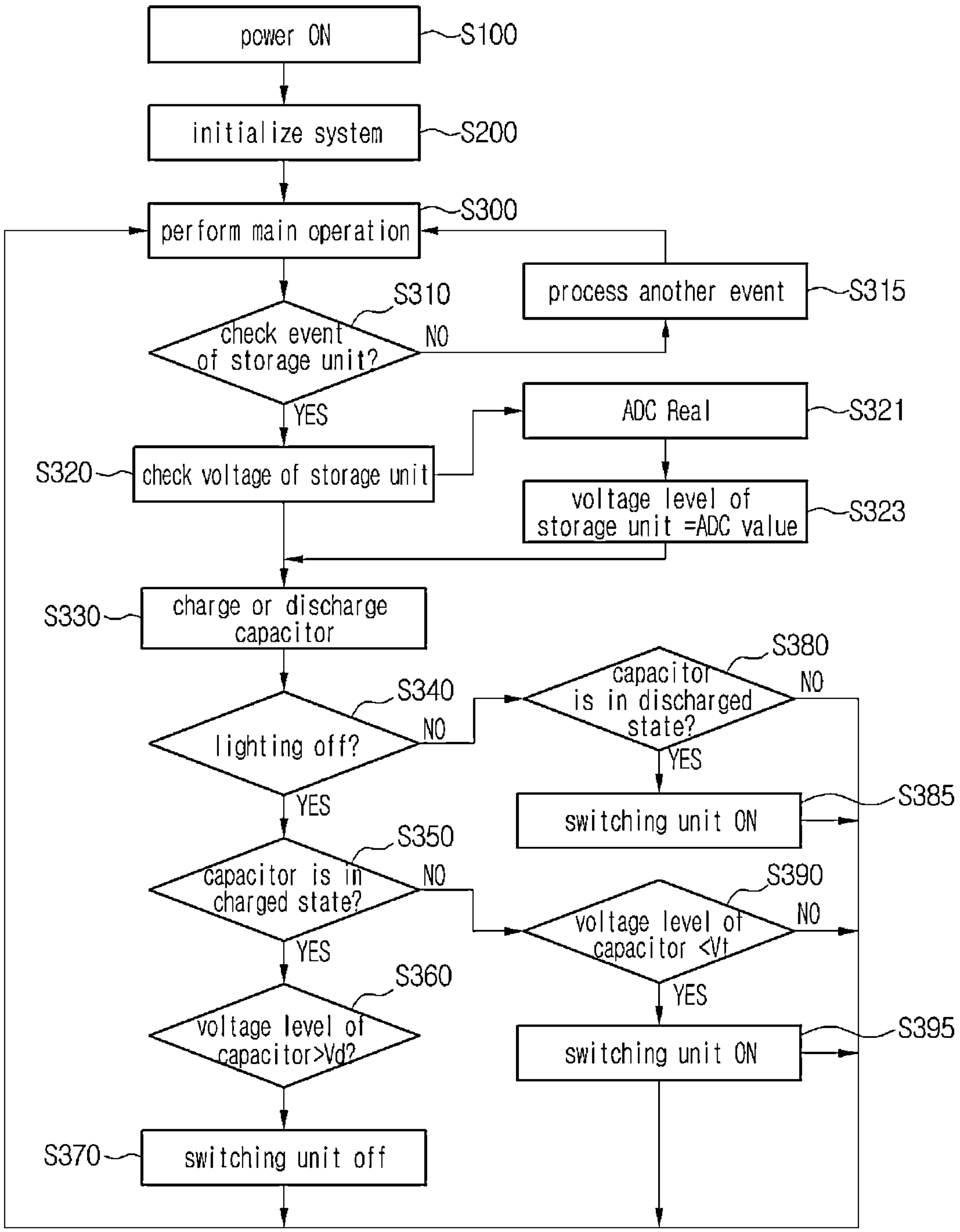
FIG. 5 is a flowchart showing the operation of a lighting control module of FIG. 1.

Hereinafter, the operation of generating the standby voltage of the lighting control unit 20 will be described with reference to FIGS. 5 and 6.

First, if the AC power is applied to the wired controller 40 so that the wired controller 40 starts to operate (step S100), the entire system is initialized (step S200).

Figure 6:
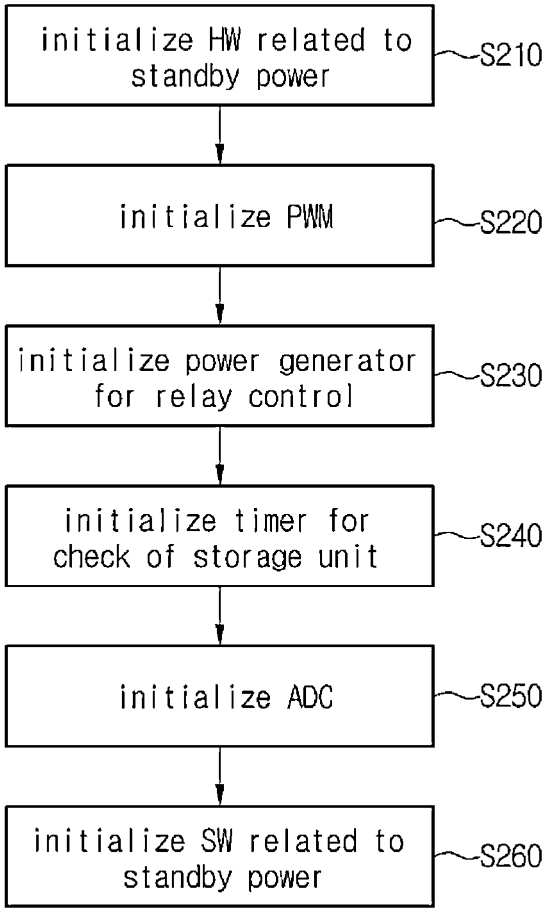
FIG. 6 is a detailed flowchart showing an initialization step of FIG. 5.

The system initialization process may be performed as shown in FIG. 6.

In other words, hardware related to the standby power is initialized (step S210). In other words, the wireless module power supply unit 43, the power generating unit 55, and the power control unit 57 are initialized.

Next, the PWM of the LED driving unit 45 is initialized so that the control signal may be received (step S220).

Then, after the power control unit 57 initializes a relay control oscillator to generate the switching signal (step S230), the power control unit 57 initializes the timer for checking the storage unit of the wireless control unit 50 (step S240). Subsequently, the power control unit 57 initializes an AC-DC converter thereof (step S250) to initialize a residual voltage level read out of the super capacitor.

Finally, the power control unit 50 initializes software related to the standby power so that the operation of generating the standby power can be started (step S260).

If the initialization operation is terminated, the processor of the wireless module unit performs a main operation of generating the standby power (step S300).

First, the wireless control unit 50 determines if an event for checking the storage unit 63 occurs (step S310).

If the event for checking the storage unit 63 is periodically generated, the power control unit 57 checks the voltage of the super capacitor of the storage unit 63 (step S320). In this case, if the event for checking the storage unit 63 does not occur, another event may be processed (step S315).

The power control unit 57 detects the voltage level of the super capacitor to convert the voltage level into a predetermined level through the AC-DC converter (step S321), and stores the converted voltage level as an ADC value (step S323).

Next, the power control unit 57 charges or discharges the super capacitor depending on the stored ADC value (step S330).

First, the power control unit 57 determines if the lighting unit 30 is turned off (step S340). If the lighting unit 30 is turned off, the power control unit 57 senses the charged state of the super capacitor (step S350).

If the super capacitor is fully charged, and the ADC value is greater than a Vd value (step S360), the first and second switches S1 and S2 of the switching unit 61 are turned off (step S370).

In this case, the Vd value may be 3.25V which is the minimum standby voltage required at the sleep mode of the wireless communication unit 51.

If the first and second switches S1 and S2 of the switching unit 61 are turned off as described above, the wireless module power supply unit 43 is disconnected from the super capacitor, so that the super capacitor is maintained at a floating state. Accordingly, the charges stored in the super capacitor are discharged.

Meanwhile, if the lighting unit 30 is maintained at the on-state, the super capacitor is checked for the discharge state (step S380).

If the super capacitor is at the discharge state, the first and second switches S1 and S2 of the switching unit 61 are simultaneously turned on so that the super capacitor is charged (step S385).

Meanwhile, if the super capacitor is not charged in the state that the lighting unit is turned off, and if the ADC value is less than the Vt (step S390), the first and second switches S1 and S2 of the switching unit 61 are turned on so that the super capacitor is charged (step S395).

If the ADC value is greater than the Vt, the present state is maintained.

In this case, the Vt value may be 2.4 V, but the embodiment is not limited thereto.

The wireless communication unit 51 of the wireless control unit 50 may be maintained at the sleep mode for at least 20 minutes if the standby power is implemented from the voltage charged in the super capacitor. Accordingly, the period may be set within 20 minutes.

In addition, the voltage level of the super capacitor is periodically detected and the charging and discharging of the super capacitor are induced, thereby supplying the standby power to continuously maintain the sleep mode.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A power supply device comprising:

a wired controller receiving AC power to generate a driving voltage, and outputting a lighting driving signal;

a wireless controller wirelessly receiving a lighting control signal and outputting the lighting control signal to the wired controller; and a standby power supply unit supplying the AC power to an AC/DC rectifying unit of the wired controller; wherein the standby power supply unit receives a reference standby voltage based on the driving voltage from the wired controller, stores the reference standby voltage in a capacitor, and supplies the reference standby voltage to the wireless controller as standby power through a power control unit;

wherein the standby power supply unit comprises:

a switching unit supplying the reference standby voltage according to a switching signal that is transmitted from the wireless controller; and wherein the capacitor is charged with the reference standby voltage and is discharged by supplying the reference standby voltage to the wireless controller;

wherein the switching unit comprises a first switch supplying the AC power to the wired controller, and a second switch supplying the reference standby voltage to the capacitor;

wherein when a lighting unit is turned off and a voltage level of the capacitor is greater than a first reference voltage and the capacitor is fully charged, the first switch and the second switch are turned off;

wherein when the lighting unit is turned on and the capacitor is in a discharge state, the first switch and the second switch are turned on; and wherein when the lighting unit is turned off and the capacitor is not charged and a voltage level of the capacitor is lower than a second reference voltage, the first switch and the second switch are turned on.

2. The power supply device of claim 1, wherein the capacitor is a large-capacity capacitor charged with a voltage in a range of 3.6V to 5.5 V.

3. The power supply device of claim 1, wherein the wireless controller comprises:

a wireless communication unit receiving and processing the lighting control signal from an outside through a wireless network;

a power generating unit receiving the reference standby voltage from the capacitor and converting the reference standby voltage into a voltage having a standby power level of the wireless communication unit; and the power control unit detecting a voltage level of the capacitor to output the switching signal to the switching unit.

4. The power supply device of claim 1, wherein the wireless communication unit applies the standby power at a sleep mode to receive the lighting control signal.

5. A lighting apparatus comprising:

a lighting unit including a plurality of lighting emitting diodes; and a lighting control unit receiving AC power, and receiving a lighting control signal for the lighting unit through a wired scheme or a wireless scheme to output a lighting driving signal to the lighting unit;

wherein the lighting control unit comprises a capacitor storing a reference standby voltage generated from the AC power, and supplying the reference standby voltage as standby power to wirelessly receive the lighting control signal;

wherein the lighting control unit further comprises:

a wired controller receiving the AC power to generate a driving voltage and outputting the lighting driving signal;

a wireless controller wirelessly receiving the lighting control signal and outputting the lighting control signal to the wired controller; and a standby power supply unit supplying the AC power to the wired controller, storing the reference standby voltage by receiving the reference standby voltage from the driving voltage, and supplying the reference standby voltage to the wireless controller as the standby power;

wherein the standby power supply unit comprises:

a switching unit supplying the reference standby voltage according to a switching signal that is transmitted from the wireless controller; and the capacitor charged with the reference standby voltage and discharged by supplying the reference standby voltage to the wireless controller;

wherein the switching unit comprises a first switch supplying the AC power to the wired controller, and a second switch supplying the reference standby voltage to the capacitor;

wherein when a lighting unit is turned off and a voltage level of the capacitor is greater than a first reference voltage and the capacitor is fully charged, the first switch and the second switch are turned off;

wherein when the lighting unit is turned on and the capacitor is in a discharge state, the first switch and the second switch are turned on; and wherein when the lighting unit is turned off and the capacitor is not charged and a voltage level of the capacitor is lower than a second reference voltage, the first switch and the second switch are turned on.

6. The lighting apparatus of claim 5, wherein the capacitor is a large-capacity capacitor charged with a voltage in a range of 3.6V to 5.5V.

7. The lighting apparatus of claim 5, wherein the wireless controller comprises:

a wireless communication unit receiving and processing the lighting control signal from an outside through a wireless network;

a power generating unit receiving the reference standby voltage from the capacitor and converting the reference standby voltage into a voltage having a driving voltage level of the wireless communication unit; and a power control unit detecting a voltage level of the capacitor to output a switching signal to the switching unit.

8. The lighting apparatus of claim 7, wherein the wireless communication unit applies the standby power at a sleep mode to receive the lighting control signal.

9. A method of driving a lighting apparatus comprises a lighting unit and a lighting control unit: wherein the lighting unit comprises a plurality of lighting emitting diodes, and the lighting control unit receiving AC power through a wired controller, and receiving a lighting control signal for the lighting unit through a wired scheme or a wireless scheme to output a lighting driving signal to the lighting unit, and wherein the lighting control unit further comprises a capacitor storing a reference standby voltage generated from the AC power through the wired controller and supplying the reference standby voltage as standby power to a wireless controller for wirelessly receive the lighting control signal, the method comprising:

periodically checking a voltage level of the capacitor;

converting the voltage level to a predetermined voltage level;

charging the capacitor with the AC power when the predetermined voltage level of the capacitor is lower than a first reference voltage; and discharging the voltage of the capacitor as a voltage for standby power by cutting off the AC power when the predetermined voltage level of the capacitor is higher than a level of a second reference voltage.

10. The method of claim 9, wherein the checking of the predetermined voltage level of the capacitor comprises:

initializing an operation of the lighting control unit;

determining when a check event for the capacitor periodically occurs; and reading a voltage of the capacitor.

11. The method of claim 10, wherein the charging of the capacitor with the AC power comprises:

determining when the lighting unit is in an off state;

determining when the capacitor is in a discharged state when the lighting unit is in an on state; and charging the capacitor with a voltage branching from the AC power when the capacitor is in the discharged state.

12. The method of claim 11, wherein the capacitor is a large-capacity capacitor charged with the predetermined voltage in a range of 3.6V to 5.5V.

13. The method of claim 10, wherein the charging of the capacitor with the AC power comprises:

determining when the lighting unit is in an off state;

determining when the capacitor is in a charged state when the lighting unit is in the off state; and charging the capacitor with a voltage branching from the AC power when the capacitor is not charged, and when the predetermined voltage of the capacitor is equal to or less than a reference voltage.

* * * * *